United States Patent
Krishnan et al.

(10) Patent No.: US 11,591,482 B2
(45) Date of Patent: Feb. 28, 2023

(54) HIGH SPEED WATER-BASED INKS CONTAINING ALCOHOL TOLERANT LATEXES

(71) Applicant: SUN CHEMICAL CORPORATION, Parsippany, NJ (US)

(72) Inventors: Ramasamy Krishnan, North Brunswick, NJ (US); Russell Schwartz, Cincinnati, OH (US); Juanita Parris, Montvale, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 343 days.

(21) Appl. No.: 16/628,356

(22) PCT Filed: Jul. 18, 2018

(86) PCT No.: PCT/US2018/042700
§ 371 (c)(1),
(2) Date: Jan. 3, 2020

(87) PCT Pub. No.: WO2019/018532
PCT Pub. Date: Jan. 24, 2019

(65) Prior Publication Data
US 2020/0216689 A1 Jul. 9, 2020

Related U.S. Application Data

(60) Provisional application No. 62/534,891, filed on Jul. 20, 2017.

(51) Int. Cl.
C09D 11/033 (2014.01)
C09D 11/107 (2014.01)
B41M 5/50 (2006.01)

(52) U.S. Cl.
CPC ............ *C09D 11/033* (2013.01); *B41M 5/50* (2013.01); *C09D 11/107* (2013.01)

(58) Field of Classification Search
None
See application file for complete search history.

(56) References Cited

U.S. PATENT DOCUMENTS

| | | | |
|---|---|---|---|
| 5,114,479 | A | 5/1992 | Keaveney et al. |
| 5,127,948 | A | 7/1992 | Shepherd |

(Continued)

FOREIGN PATENT DOCUMENTS

| | | |
|---|---|---|
| AU | 5257799 | 4/2000 |
| AU | 5941200 | 3/2002 |

(Continued)

OTHER PUBLICATIONS

BASF's Resin and Additives Selection Guide (Year: 2018).*

(Continued)

*Primary Examiner* — Vu A Nguyen
(74) *Attorney, Agent, or Firm* — Marian E. Fundytus; Ostrolenk Faber LLP

(57) ABSTRACT

Described herein are water-based inks that comprise water, a water miscible solvent having a boiling point of about 56° C. to about 98° C., and a latex. In one aspect, the water miscible solvent comprises about 10 wt % to about 30 wt % of the ink (based on the total weight of the ink). In another aspect, the latex is an alcohol-tolerant latex that exhibits limited or no particle size increase in the presence of alcohol. Further described herein are articles printed with the inks, and methods of printing with the inks.

17 Claims, 1 Drawing Sheet

(56) References Cited

U.S. PATENT DOCUMENTS

| | | | |
|---|---|---|---|
| 8,709,288 B2 | 4/2014 | Rouse et al. | |
| 2012/0321794 A1* | 12/2012 | Durand, Jr. .......... | C09D 11/033 |
| | | | 427/256 |
| 2014/0015912 A1 | 1/2014 | Brandstein et al. | |
| 2015/0197649 A1 | 7/2015 | Oya et al. | |
| 2017/0022377 A1 | 1/2017 | Verheggen et al. | |

FOREIGN PATENT DOCUMENTS

| | | | |
|---|---|---|---|
| AU | 423 7702 | | 11/2002 |
| CN | 100 575 433 C | | 12/2009 |
| CN | 100575433 C | * | 12/2009 |
| CN | 102382510 | | 3/2012 |
| CN | 102605678 | | 7/2012 |
| CN | 102649889 | | 8/2012 |
| CN | 103819962 | | 5/2014 |
| CN | 104672982 | | 6/2015 |
| CN | 104693888 | | 6/2015 |
| CN | 104710876 | | 6/2015 |
| CN | 105 03 8 402 A | | 11/2015 |
| CN | 105062208 | | 11/2015 |
| DE | 10-2004051019 | | 4/2006 |
| GB | 1578859 | | 11/1980 |
| JP | H 07 41719 A | | 2/1995 |
| JP | H 07 126562 A | | 5/1995 |
| JP | 2017002266 | | 1/2017 |
| WO | WO-9939838 A1 | * | 8/1999 ............. D21H 19/40 |

OTHER PUBLICATIONS

English-language translation of CN-100575433-C.*
International Search Report issued in International Application No. PCT/US2018/042700, dated Sep. 28, 2018.
Written Opinion of the International Searching Authority issued in International Application No. PCT/US2018/042700, dated Sep. 28, 2018.
International Preliminary Report on Patentability (Chapter II of the Patent Cooperation Treaty) issued in International Application No. PCT/US2018/042700, dated Sep. 18, 2019.
Supplementary European Search Report issued in International Application No. EP 18 83 5696, dated Feb. 24, 2021.
Columbian Office Action issued in counterpart Columbian Application No. NC 2019/0015070, dated Jul. 23, 2021 with English language machine translation thereof.

* cited by examiner

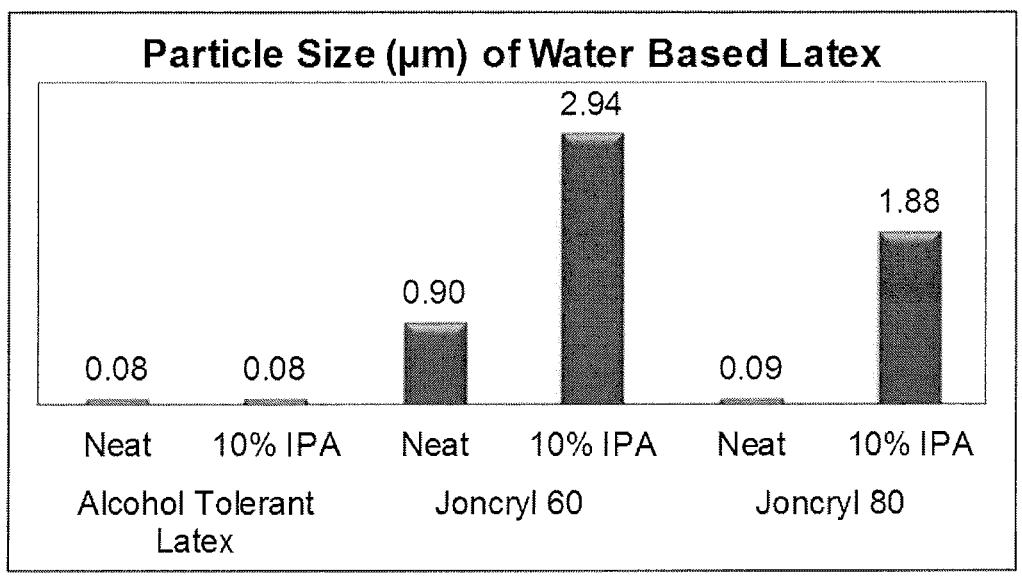

HIGH SPEED WATER-BASED INKS CONTAINING ALCOHOL TOLERANT LATEXES

CROSS REFERENCE TO RELATED APPLICATIONS

The present application is a § 371 National Phase application based on PCT/US2018/042700 filed Jul. 18, 2018, which claims the benefit of U.S. Provisional Application No. 62/534,891, filed Jul. 20, 2017, the subject matter of each of which is incorporated by reference in their entirety.

FIELD OF THE INVENTION

The invention disclosed herein is directed to the field of printing inks, and in particular to water-based inks. The inks may be printed by any number of printing techniques, such as flexo, gravure, screen printing, digital printing, among others.

BACKGROUND OF THE INVENTION

State of the art solvent based inks typically contain slow solvents such as glycol ethers, which keep the ink from drying before it contacts the substrate. However, these solvents cause adverse plate swelling and diminish long term runnability at high speeds (e.g., 2000 feet per minute (fpm) or greater).

Advantageously, water-based ink formulations are less flammable than solvent-based inks. The flash point of a water-based ink should be less than that of a solvent based ink. This eliminates a potential safety hazard encountered during printing operations. Further, water is a significantly cheaper solvent than the commonly used organic solvents. However, water-based inks known in the art are not suited for high speed printing.

An opaque water-based ink obtains its opaqueness through the inclusion of a white pigment material in the ink formulation. Titanium dioxide ($TiO_2$) and zinc sulfide (ZnS) are examples of white pigment materials that may be included in an ink. Opaque ink formulations are used to obscure, hide and/or cover underlying ink layers and/or the substrate on which the opaque inks are printed. Opaque ink is also used to enhance the appearance of an ink printed on over the opaque ink. For example, a colored ink printed over an opaque ink will exhibit brighter color and cleaner appearance. Water-based opaque inks are often used in this manner, that is, as first down inks.

Representative publications showing state of the art formulations include CN105062208, CN102649889, CN103819962, CN104672982, JP2017002266, CN104693888, CN102382510, U.S. Pat. No. 8,709,288, CN104710876, DE102004051019, IN2015MN03487, AU5257799, CN102605678, AU5941200, AU4237702, GB1578859 and US 2015/0197649.

US 2015/0197649 describes an alcohol-based printing ink that is based on a polyurethane-urea resin and an alcohol content of at least 50%.

SUMMARY OF THE INVENTION

Described herein are water-based inks that comprise water, a water miscible solvent having a boiling point of about 56° C. to about 98° C., and a latex. In one aspect, the water miscible solvent comprises about 10 wt % to about 30 wt % of the inks (based on the total weight of the inks).

In another aspect, described herein are articles that are printed or coated with the water-based inks described herein. The articles comprise a substrate that is printed or coated with the water-based inks that are described herein.

In another aspect, described are printing methods in which articles are printed with the water-based inks described herein, e.g., at high printing speeds.

In another aspect, the water miscible solvent comprises a solvent selected from an alcohol, a ketone, an acetate, and mixtures thereof.

In another aspect, the water miscible solvent comprises an alcohol or a mixture of alcohols.

In another aspect, the water miscible solvent is an alcohol or a mixture of alcohols.

In another aspect, the water miscible solvent comprises an alcohol selected from ethanol, n-propanol, isopropyl alcohol, and mixtures thereof.

In another aspect, the water miscible solvent is an alcohol selected from ethanol, n-propanol, isopropyl alcohol, and mixtures thereof.

In another aspect, the water miscible solvent comprises ethanol.

In another aspect, the water miscible solvent is ethanol.

In another aspect, the latex comprises polymeric resin particles, that when exposed to alcohol or other water-miscible solvent, undergo a particle size increase of 0 to 15%, preferably 0% to 10%, more preferably 0% to 5.0%, even more preferably 0% to 3.0%, and still even more preferably 0% to 1.0%.

In another aspect, the latex comprises acrylic resin particles.

In another aspect, the latex comprises resin particles of acrylic homo- or co-polymers, for example, co-polymers of styrene-acrylic, styrene-butadiene, vinyl-acrylic, and acrylic-vinyl acetate.

In another aspect, in combination, the water and the water-miscible solvent comprise 15% to about 40 wt % of the total composition of the ink.

In another aspect, the water-miscible solvent is present in the inks in an amount of about 10 wt % to about 30 wt %, preferably about 10 wt % to about 20 wt %.

In another aspect, the water-based inks further comprise one or more additional resin components, such as for example, a vinyl, a rosin, a polyamide, and mixtures thereof.

In another aspect, the water-based inks further comprise a surfactant.

In another aspect, the water-based inks further comprise a defoamer.

In another aspect, the water-based inks further comprise a dispersant.

In another aspect, the water-based inks further comprise a wax.

In another aspect, the water-based inks further comprise colorants, such as white pigments (e.g., $TiO_2$) and colored organic and inorganic pigments.

In another aspect, the inks are high speed printing inks.

In another aspect, the inks are flexographic printing inks.

In another aspect, the inks are printable on a flexographic press at speeds of greater than or equal to (≥) 600 meters/minute.

In another aspect, the inks have a dynamic surface tension of about 25 dynes/cm to about 35 dynes/cm.

In another aspect, the inks have a flash point of about ≥40° C., preferably about ≥60° C., and more preferably about ≥80° C.

In one aspect, the disclosed inks contain a colorant. The colorant may be pigment. The colorant may be a white pigment or a color pigment.

In one particular aspect, described herein is a water-based high speed flexographic printing ink comprising a water miscible solvent having a boiling point of about 56° C. to about 98° C. in an amount of about 10 wt % to about 30 wt %, water, and an alcohol tolerant latex. In a preferred embodiment of the water-based high speed flexographic printing ink, the water miscible solvent is present in the range of about 10 wt % to about 20 wt % and/or the alcohol tolerant latex is present in the range of about 20 wt % to about 50 wt %. The amounts are based on the total weight of the ink.

In another aspect, the water miscible solvent of the water-based high speed flexographic printing ink comprises a solvent selected from an alcohol, a ketone, an acetate, and mixtures thereof.

In another aspect, the water miscible solvent of the water-based high speed flexographic printing ink comprises an alcohol or a mixture of alcohols.

In another aspect, the water miscible solvent of the water-based high speed flexographic printing ink is an alcohol or a mixture of alcohols.

In another aspect, the water miscible solvent of the water-based high speed flexographic printing ink comprises an alcohol selected from ethanol, n-propanol, isopropyl alcohol, and mixtures thereof.

In another aspect, the water miscible solvent of the water-based high speed flexographic printing ink is an alcohol selected from ethanol, n-propanol, isopropyl alcohol, and mixtures thereof.

In another aspect, the water miscible solvent of the water-based high speed flexographic printing ink comprises ethanol.

In another aspect, the water miscible solvent of the water-based high speed flexographic printing ink is ethanol.

In another aspect, the latex of the water-based high speed flexographic printing ink comprises polymeric resin particles that when exposed to alcohol or other water-miscible solvent, undergo a particle size increase of 0 to 15%, preferably 0% to 10%, more preferably 0% to 5.0%, even more preferably 0% to 3.0%, and still even more preferably 0% to 1.0%.

In another aspect, the latex of the water-based high speed flexographic printing ink comprises acrylic resin particles.

In another aspect, described herein are articles that are printed or coated with the water-based high speed flexographic printing ink described herein. The articles comprise a substrate that is printed or coated with the water-based inks that are described herein.

In another aspect, described are printing methods in which articles are printed with the water-based high speed flexographic printing ink described herein.

In another aspect, the water-based high speed flexographic printing inks are printed on a flexographic press at speeds of greater than or equal to (≥) 600 meters/minute.

In another particular inventive aspect, described herein is a water-based high speed gravure printing ink comprising a water miscible solvent having a boiling point of about 56° C. to about 98° C. in an amount of about 10 wt % to about 30 wt %, water, and an alcohol tolerant latex. In a preferred embodiment of the water-based high speed gravure printing ink, the water miscible solvent is present in the range of about 20 wt % to about 30 wt % and/or the alcohol tolerant latex is present in the range of about 20 wt % to about 30 wt %. The amounts are based on the total weight of the ink.

In another aspect, the water miscible solvent of the water-based high speed gravure printing ink comprises a solvent selected from an alcohol, a ketone, an acetate, and mixtures thereof.

In another aspect, the water miscible solvent of the water-based high speed gravure printing ink comprises an alcohol or a mixture of alcohols.

In another aspect, the water miscible solvent of the water-based high speed gravure printing ink is an alcohol or a mixture of alcohols.

In another aspect, the water miscible solvent of the water-based high speed gravure printing ink comprises an alcohol selected from ethanol, n-propanol, isopropyl alcohol, and mixtures thereof.

In another aspect, the water miscible solvent of the water-based high speed gravure printing ink is an alcohol selected from ethanol, n-propanol, isopropyl alcohol, and mixtures thereof.

In another aspect, the water miscible solvent of the water-based high speed gravure printing ink comprises ethanol.

In another aspect, the water miscible solvent of the water-based high speed gravure printing ink is ethanol.

In another aspect, the latex of the water-based high speed gravure printing ink comprises polymeric resin particles that, when exposed to alcohol or other water-miscible solvent, undergo a particle size increase of 0 to 15%, preferably 0% to 10%, more preferably 0% to 5.0%, even more preferably 0% to 3.0%, and still even more preferably 0% to 1.0%.

In another aspect, the latex of the water-based high speed gravure printing ink comprises acrylic resin particles.

In another aspect, described herein are articles that are printed or coated with the water-based high speed gravure printing ink described herein. The articles comprise a substrate that is printed or coated with the water-based inks that are described herein.

In another aspect, described are printing methods in which articles are printed with the water-based high speed gravure printing ink described herein.

In another aspect, the water-based high speed gravure printing inks are printable on a gravure press at speeds of ≥200 meters/minute.

The inventors have discovered that in printing operations, such as on flexo and gravure presses, the water-based inks described herein reduce if not eliminate plate swelling. A further advantage is that they do not include slow solvents (e.g., glycol ethers). Still further, the inventors have found that at high speeds, the described inks print as well as if not better than solvent-based inks, particularly on flexo and gravure printing presses. That the described inks print successfully at high speeds, such as on flexo and gravure printing presses, is a particularly important milestone attained by the inks described herein. It is believed that effective high speed water-based inks have not been previously available.

Also, since the present inks perform better or as well as state of the art high speed solvent-based inks and contain relatively low amounts of volatile organic compounds (VOCs), their use reduces workplace hazards and leads to a healthier workplace environment (e.g., lesser amounts of evaporating volatiles in the environment to breath in, thereby improving workplace air quality and reducing the possibility of contracting illnesses. Further, the risk of combustion is reduced when using a low VOC ink).

While state of the art first down water-based white ink may currently be run on gravure or flexo presses, which may reduce solvent emissions and have low flammability risk, these inks print at slower speeds and do not adhere well to many polymeric substrates.

Applicants have found that the inks described herein can be printed on various different substrate materials, such as, for example, polyethylene, polypropylene, polyethylene terephthalate, and polyamides.

BRIEF DESCRIPTION OF THE DRAWINGS

FIG. 1 is a bar graph plotting the particle size increase of a latex that can be used in the present water-based inks and the particle size increase of other latexes in neat and 10% isopropyl alcohol solutions.

DETAILED DESCRIPTION OF THE INVENTION

Definitions

As used herein, the use of the singular includes the plural unless specifically stated otherwise. For example, the singular forms "a," "an" and "the" are intended to include the plural forms, unless the context clearly indicates otherwise.

As used herein, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the description or the claims, such terms are intended to be inclusive in a manner similar to the term "comprising."

As used herein, ranges and amounts may be expressed as "about" a particular value or range. "About" is intended to also include the exact amount. For example, "about 5 percent" means "about 5 percent" and also "5 percent." "About" means within typical experimental error for the application or purpose intended.

As used herein, the terms "monomer" or "monomers" is intended to embrace monomers, oligomers, and mixtures thereof.

As used herein, the terms "polymer" and "polymers" includes copolymers unless indicated otherwise.

As used herein, the terms "inks and coatings," "inks," "compositions" and "fluids" are used interchangeably.

Throughout this disclosure, all parts and percentages are by weight (wt % or mass % based on the total weight) and all temperatures are in ° C. unless otherwise indicated.

Described herein are water-based inks that comprise a water miscible solvent having a boiling point of about 56° C. to about 98° C., water, and a latex. In one aspect, the water miscible solvent comprises about 10 wt % to about 30 wt % of the inks (based on the total weight of the inks).

The water miscible solvents include alcohols, ketones, acetates, and mixtures thereof. The preferred water-miscible solvents are alcohols, such as ethanol, n-propanol, and isopropyl alcohol. Ethanol may be the more preferred water-miscible solvent, alone or in combination with another water-miscible solvent, e.g., isopropyl alcohol.

The amount of water miscible solvent in the inks may be about 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, about 30 wt %, and fractions of these values. These ranges apply to all combinations of water miscible solvents described herein.

Alternatively, the water miscible solvent range may be about 10 wt % to about 30 wt %, about 11 wt % to about 29 wt %, about 12 wt % to about 28 wt %, about 13 wt % to about 27 wt %, about 14 wt % to about 26 wt %, about 15 wt % to about 27 wt %, about 16 wt % to about 26 wt %, about 17 wt % to about 25 wt %, about 18 wt % to about 24 wt %, about 19 wt % to about 23 wt %, about 20 wt % to about 22 wt %, and fractions of these values. These ranges apply to all combinations of water miscible solvents described herein.

As used herein, a "latex" is a stable dispersion of polymer microparticles in an aqueous medium.

In one aspect, the water-based inks include a latex in which the polymeric resin particles in the latex, when exposed to alcohol or other water-miscible solvent, undergo a particle size increase of 0 to 15%, preferably 0% to 10%, more preferably 0% to 5.0%, even more preferably 0% to 3.0%, and still even more preferably 0% to 1.0%. A "particle size increase" is defined herein as an increase in the size of the resin particles of a latex material upon exposure to a 25 wt % aqueous solution of ethanol at a temperature of 25° C. for 10 minutes, as determined in a Horiba particle size analyzer by dynamic light scattering at 25° C.

The latexes that exhibit limited (e.g., not exceeding 15%) to no particle size increase as described above are preferably included in the present water-based inks. Such latexes are considered to be "alcohol-tolerant latexes". The compositions of inks containing alcohol-tolerant latexes are uniform, have acceptable viscosities for the printing operation in question (e.g., flexo, gravure), and adhere well to substrates.

On the other hand, inks containing what may considered to be non-alcohol tolerant latexes, that is, latexes that increase more than 15% in particle size in the presence of 25 wt % aqueous ethanol solution under the above-described conditions, have been found to have unacceptable print properties. For example, such inks have been found exhibit unacceptably high viscosities, making them difficult to run on a printing press. While this issue could conceivably be addressed by reducing the ink with further water and/or solvent, this has the effect of reducing the concentration of other components and the effectiveness and/or functionality of same. For example, solvent addition could reduce the opacity of a white ink due to pigment dilution.

The inventors have found several commercially available aqueous acrylic resin latexes that are alcohol tolerant. Among them are 2514 HV™ Latex (Alberdingk Boley, Inc.), Joncryl® 74 (BASF), HydriPrint™ 604, and Lucidene™ 4045 Lucidene™ 4045 is an aqueous styrene/acrylic emulsion available from Dow Chemical Company. The HydriPrint™ 604latex is available from IMCD, Lakewood Ohio. HydriPrint™ 604 shows no increase in particle size in the presence of ethanol. 2514 HV™ Latex and Joncryl® 74 show about a 5% increase in particle size in the presence of ethanol. Lucidene™ 4045 does not undergo a particle size increase in the presence of ethanol.

One or more alcohol tolerant latexes may be included in the inks described herein. In one aspect, the total amount of alcohol tolerant latexes included in the ink is about 5 wt % to about 50 wt %, preferably 15 wt % to about 45 wt %, more preferably about 25 wt % to about 40 wt %, and even more preferably about 30 wt % to about 40 wt %.

The water present in the described inks may be supplied in whole or in part by the water present in the aqueous latexes that are included in the ink formulations. Water may also be added to the ink formulations apart from what is present in the aqueous latexes.

FIG. 1 shows that when the alcohol tolerant 2514 HV latex is exposed to a 10 wt % aqueous solution of isopropyl alcohol, it underdoes 0% particle size increase, in relation the particle size of the "neat" latex. In other words, the alcohol tolerant latex maintains a constant particle size when exposed to the alcohol in the ink formulation.

In contrast, FIG. 1 also shows that the Joncryl® 60 and Joncryl® 80 latexes undergo substantial particle size increases when exposed to 10 wt % aqueous solution of isopropyl alcohol, in relation to the "neat" forms.

The latex used herein may be comprised of different kinds of polymeric resin particles. In one aspect, the latex is an acrylic latex that contains acrylic resin particles. The acrylic resin particles may be acrylic homo- or co-polymer resin particles. Acrylic-vinyl resin particles are one example of resin particles that may be incorporated in the aqueous medium of the latex. Co-polymers include, for example, co-polymers of styrene-acrylic, styrene-butadiene, vinyl-acrylic, and vinyl acetate-acrylic.

In one aspect, the inks exhibit a dynamic surface tension of about 25 dynes/cm to about 35 dynes/cm, at a frequency of 5/sec.

In one aspect, the inks are high speed printing ink or composition, such as those suitable for printing on a flexo press and/or a gravure press.

In another aspect, the inks are printable on a flexographic press at speeds of ≥600 meters/minute.

In another aspect, the inks are gravure printing inks.

In another aspect, the inks are printable on a gravure press at speeds of ≥200 meters/minute.

Another advantage of the inks described herein is that the amounts of water-miscible solvents such as alcohols are reduced, while printing speed and printing quality is maintained. The reduction in solvent amount means that the inks have higher flash points, which reduces the likelihood of combustion and fire. For example, as noted above, the flash points of the inks may be about ≥40° C., preferably about ≥60° C., and more preferably about ≥80° C.

Also, the present inks contain lower volatile organic compounds (VOCs) than state of the art high speed solvent-based inks. The present water-based inks provide an alternative to solvent based inks, which generally have been the only option available for printing at high speeds, while advantageously eliminating the safety hazards associated with using inks that include large amounts of volatile components.

The inks of the present may also optionally comprise colorants, such as organic and inorganic pigments. Examples of inorganic pigments include such as Pigment White 6 (Titanium Dioxide), zinc sulfide (ZnS), Pigment Black 7 (carbon black), Pigment Black 11 (Black Iron Oxide), Pigment Red 101 (Red Iron Oxide) and Pigment Yellow 42 (Yellow Iron Oxide). Organic pigments include Pigment Yellow 1, Pigment Yellow 3, Pigment Yellow 12, Pigment Yellow 13, Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 26, Yellow 126, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23 and others. Combinations of pigments may be used.

In a preferred aspect, the pigments included in the present inks are milled to a particle size that is less than 1 micrometer, and after milling, have a preferred particle size distribution of about 10 nm to about 500 nm, more preferably about 10 nm to about 350 nm, so as to provide the present inks with better transparency and a wide color gamut.

To incorporate the above-described pigments into the present inks, it is preferred that the pigments be manufactured and stably stored as pigment dispersions in water. This is may be achieved by dispersing the pigment into a water-soluble or water-dispersible resin using a water-soluble and/or a water-dispersible surfactant, which introduces hydrophilic functional groups into the surface of the pigment particles. Examples of such dispersing resins include but are not limited to polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, and vinyl acetate-acrylic acid copolymers, and the salts thereof. The copolymers can be used in any form of random copolymer, block copolymer, alternating copolymer and graft copolymer. Examples of such resins include Joncryl® 67, 678, 8500, 586, 611, 680, 682, 683 and 69 available from BASF. Examples of the salts include sodium hydroxide, potassium hydroxide and salts of basic compounds such as ammonia, ethylamine, diethanolamine, triethanolamine, propylamine, isopropylamine, dipropylamine, butylamine, isobutyl amine, diethanolamine, triethanolamine, triisopropanolamine, dimethyl ethanolamine, amino methyl propanol, and morpholine. The amount of the basic compound is not limited so long as the resin dispersant is equal to or more than the neutralization equivalent. Combinations of the above may be used.

The colorants may be included in the inks as water-based colorant dispersions comprising about 15 wt % to about 60% pigment, about 5 wt % to about 75 wt % resin, and about 10 wt % to about 60 wt % water. These amounts are based on the total weight of the colorant dispersion. The water-based colorant dispersion may be a water-based pigment dispersion that includes a water-based acrylic resin. The water-based colorant dispersion component, if present in the inks, may be present in an amount of about 1.0 wt % to about 50 wt %, based on the total weight of the composition.

The inks of the present invention may optionally contain additional polymers and resins, such as to improve resistance properties, e.g., mar and rub resistance, and/or to improve printability or adhesion. Such resins may include but are not limited to styrenated acrylics, rosinated alkyds, melamine-formaldehyde resins, urea-formaldehyde resins, polyester-urethanes and urethanes.

Additives may be optionally included in the inks in order to improve and enhance various properties. A partial list of such additives includes, but is not limited to: adhesion promoters, silicones, light stabilizers, de-gassers, waxes, ammonia, flow promoters, crosslinkers, defoamers, antioxidants, stabilizers, surfactants, dispersants, plasticizers, rheological additives, and others.

Defoamers may be included in the present inks. Defoamers prevent the formation of foam during manufacture of the inks and also during jetting. Defoamers are particularly useful when the inks are deposited through recirculating print heads.

Examples of suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A 530, 067A, and BYK 354. DC62, DC65, DC 68, DC71 and DC74 are available from Dow Corning. Agitan 120, 150, 160, 271, 290, 298, 299, 350, 351, 731, 760, 761, and 777 are available from Munzing.

Surface control additives, also known as surfactants, can be included in the inks to adjust the surface tension of the ink. Surface control additives may also control the level of slip and scratch resistance of the inks. Examples of suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361, BYK UV 3530 and 3570, CERAFLOUR 998 and 996, NANOBYK 3601, 3610, and 3650, and CERMAT 258. Available from Cytec are EBECRYL 350 and 1360, MODAFLOW 9200, and EBECRYL 341. From Sartomer the aliphatic silicone acrylate CN9800 may be used. Surfynol® 104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont.

Other examples of surfactants include anionic surfactants such as alkane sulphonates, alpha-olefin sulphonates, alkyl benzene sulphonates, alkyl naphthalene sulphonates, acyl methyl taurinates, dialkyl sulfosuccinates, alkyl sulfates, sulfurized olefins, polyoxyethylene alkyl ether phosphates, polycarboxylic acids and mono glycerol phosphate, amphoteric surfactants such as alkylpyridinium salts and non-ionic surfactants such as polyoxyethylene alkyl ethers, polyoxyethylene alkyl phenyl ethers, polyoxyethylene alkyl esters, polyoxyethylene alkyl amides, glycerol alkyl esters and sorbitan alkyl esters. Examples include EFKA 1000, 4000, 5000 and 6000 series products from BASF, Tamol series products from Dow, and Solsperse 27,000, 40,000, 44,000, 46,000 and 47,000 from Lubrizol. Combinations of the above may be used.

De-aerators may also be included in the present inks. De-aerators may prevent the formation of air inclusions and pinholes in the printed inks after drying. Examples of de-aerators include the following products available from Evonik: TEGO AIREX 900, 910, 916, 920, 931, 936, 940, 944, 945, 950, 962, 980, and 986.

Methods of printing in accordance with the principles described in the present invention include printing the water-based inks described herein onto substrates, such as a polyethylene substrate. In one aspect, the printing methods are carried out at high speeds. High speed printing includes speeds of greater than or equal to 2000 feet per minute. For gravure printing, speeds include those greater than or equal to 200 meters/minute. For flexographic printing, speeds include those greater than or equal to 600 meters/minute.

EXAMPLES

The following examples illustrate specific aspects of the present invention and are not intended to limit the scope thereof in any respect and should not be so construed.

The following test methods were employed:

Opacity (Contrast ratio): Opacity is measured with a Technidyne BNL-3 opacity meter. Three (3) measurements are taken. The reported value is the average of the three results.

Tape adhesion: 610 tape from 3M is place over an area and then removed. The test is then repeated over the same area. Three (3) measurements are taken. The reported value is the average of the three. Pass: ≤10% ink film removal.

Heat resistance: Inks are printed onto green bond paper. The prints are heated at 20 psi pressure for one minute. The reported temperature is the temperature is the failure temperature.

Sutherland® rub: Printed sheets of green bond paper are rubbed for 500 cycles at speed 3 (88 cycles/minutes) on a Sutherland® rub tester with a 4 pound weight. A passing grade is minimal marking.

Restrained Shrink Test: Hang a four (4) inch printed sheet in an oven at 345° F. for 15 seconds. Check machine and cross directions, and observe for signs of cracking when stretched.

Dry Crinkle: Place a sample of printed film between the thumb and index finger of each hand, spaced approximately 1 inch apart. Then, the grasped film is brought together and cycled back and forth in a circular motion similar to pedaling a bicycle. This test is performed with both 10 and 20 cycles. Once complete, the sample should be wiped to remove ink particles that have come loose. No ink removal should occur.

Scratch resistance: A printed sample is placed over a resilient surface (e.g., a pad of paper) and is scratched 10 times with the fingernail of the index finger at an angle (so as not to "cut" the sample). The applied pressure is moderate pressure, and the swiping motion is fast. Pass: ≤10% ink film removal.

Nestle bottle block: Individual Nestle water bottle labels are adhered to a jar. Overwrap print samples are then heat shrunk to the jar, ink to label using a heat gun. The print is removed and checked for ink transfer.

Conventional block: Put in oven at these conditions: 120° F./50 psi/80% rh/16 hours/ink to film. Look for whether it blocks.

Coefficient of Friction (COF): 0.2-0.4 ink to film.

Test Protocol for Optical Microscopy Pinhole Analysis: Olympus BX-51: Bright field illumination/Magnification—4× is used.

Sample prints were evaluated at low magnification to capture larger field, which allows for better statistical sampling. All images were captured at 4× magnification. Image analysis software was used to count pin holes.

Example 1: Flexographic White Ink

A flexographic white ink was prepared and evaluated in an over-wrap application. The ink components and ink preparation are described in Table 1. The ink displayed equal or better performance when compared to the standard bottle wrap ("BW") control ink (Sun Chemical Corporation code CRYFS1115933A), which is a solvent-based ink that includes a combined 35 wt % of the volatile solvents propanol and propyl acetate, a white pigment, a urethane resin, and a nitrocellulose resin.

TABLE 1

| Material | Wt % |
| --- | --- |
| Surfynol ® 104 PA | 0.50 |
| HydriPrint ™ 604 | 39.00 |
| Mono ethanol amine (MEA) | 0.50 |
| Mix 5 minutes and add . . . | |
| Ethanol-SDA-3C (95/5 Ethanol/IPA) | 8.00 |
| Tap Water | 4.00 |
| Joncryl ® Wax 4 (40% Solids) | 1.00 |
| Mix 5 minutes and add . . . | |
| TR-52 (TiO$_2$ pigment) | 20.50 |
| Mix 5 minutes and add . . . | |
| TR-52 | 20.50 |
| Ethanol-SDA-3C (95/5 Ethanol/IPA) | 3.00 |
| Tap Water | 3.00 |
| | 100.00 |

The performance attributes of inventive Example 1 ink as compared to the BW solvent-based control ink are set forth in Table 2 below. The "white" test results refer to the testing the print of a white layer. The "color trap" test results refer to a print layer of white over which a colored layer of solvent based ink is printed. The inks were printed onto corona treated polyethylene sheet. The results show that Example 1 ink possesses properties similar to those of the BW control ink.

TABLE 2

| | White | | Color Trap | |
| --- | --- | --- | --- | --- |
| Tests | BW White (control) | Example 1 | BW White/ BW Color | Example 1/ BW Color |
| Opacity (Contrast Ratio) | 53.87 | 54.82 | 63.56 | 66.47 |
| Adhesion Resistance | Pass | Pass | Pass | Pass |
| Gloss | 79.1 | 78.6 | 80.3 | 81.2 |
| Rub Resistance | slight removal | Pass | Pass | Pass |
| Scratch | Poor | Poor | Poor | Poor |
| COF (Kinetic) | 0.36 | 0.42 | 0.28 | 0.30 |
| Heat Resistance | 375° F. | 475° F. | 400° F. | 475° F. |
| Restrained Shrink | Pass | Pass | Pass | Pass |
| Dry Crinkle | Pass | Pass | Pass | Pass |
| Bottle Block - Shrink film, ink to bottle label, around Glass Bottle | Pass | Pass | Pass | Pass |
| Conventional Block - Ink/Film | Pass | Slight Pick | Pass | Slight Pick |
| Water Resistance - Initial | — | — | Slight Pick | OK |
| Water Resistance - Aged | Slight Pick | OK | Slight Pick | OK |
| Bottle Block - Heat Seal - Plastic Bottle | NA | 20% Ink Transfer | 80% Ink Transfer | No Transfer |
| Bottle Block - Heat Seal - Monoweb Label | NA | very slight transfer | Pass | Pass |

Bottle Block - Heat Seal - Monoweb Label - 300° F., 5", 10 psi
Bottle Block - Heat Seal - Plastic Label - 425° F., 4", 10 psi Example 2: Water-Based White Gravure Ink A water-based white gravure ink was prepared. The components and ink preparation are described in Table 3.

TABLE 3

| Wt. % | MATERIAL & INSTRUCTIONS |
| --- | --- |
| | Gather and weigh the following materials, |
| | add to a clean mixing tub |
| 20.00 | HydriPrint ™ 399 |
| 5.50 | Lucidene ™ 4045 |
| 0.90 | Surfynol ® 104PA |
| | Turn on mixer to low speed and adjust as needed |
| | to maintain acceptable vortex |
| | Then add the following while mixing |
| 24.50 | Ethanol-SDS-3C (95/5 Ethanol/IPA) |
| | When ethanol has been thoroughly mixed |
| | Then add the following while mixing . . . |
| 23.40 | TR-52 (TiO$_2$ pigment) |
| | Mix until pigment is well dispersed then add . . . |
| 22.00 | TR-52 |
| | Mix until pigment is dispersed and show |
| | Sample to QC for grind check. |
| | When ok add the following while mixing . . . |
| 3.60 | Tap Water |
| 0.10 | MEA |
| 100.000 | TOTAL |

HydriPrint™ 399 is a styrene acrylic resin solution.

Opacity of the Example 2 white ink was 60, as measured on a BNL-3 opacity meter, indicating that the ink of this example is a high opacity ink. The Example 2 white ink was run on a rotogravure press at 900 ft/min with a 175 lip gravure cylinder. The Example 2 white ink did not pick off the ink it was applied to, and it did not bleed through ink that it came in contact with.

Example 3: Water-Based White Ink

The components and preparation steps for the Example 3 ink are described in Table 4.

TABLE 4

| Material | Wt % |
| --- | --- |
| HydriPrint ™ 604 (Tg −20° c.) | 36.00 |
| TR-52 (TiO$_2$ pigment) | 41.00 |
| Joncryl ® Wax 4 (40% Solids) | 1.00 |
| Surfynol ® 104 PA | 0.50 |
| Ethanol-SDA-3C (95/5 Ethanol/IPA) | 14.00 |
| Tap Water | 7.00 |
| MEA | 0.50 |
| Total | 100.00 |
| Bulk Viscosity/cps | 97 |

The white ink of Inventive Example 3 was compared to the standard bottle wrap ("BW") control ink, which is the solvent-based white ink described above in Example 1. The results appear below.

TABLE 5

| | Bottle Overwrap Application | |
| --- | --- | --- |
| | Solvent Base White Ink | Example 3 |
| Contrast Ratio | 57.0 | 60.0 |
| BNL3 Opacity | 54.0 | 56.0 |
| % TiO$_2$ | 41.0 | 41.0 |
| Dynamic Surface Tension | 35.0 | 35.0 |
| 610 Tape Adhesion Resistance | Good | Good |
| Fingernail Scratch Resistance | Good | Good |
| Ice Water Crinkle | Good | Good |

As shown the Example 3 ink is comparable in properties to the solvent-based white ink.

Example 4: Yellow Ink Composition

A yellow ink was included the following components, which were combined to form the ink:

TABLE 6

| Material | Wt % |
| --- | --- |
| Flexiverse ® yellow base | 50 wt % |
| Joncryl ® 74 (60 wt % water) | 33 wt % |
| Ethanol | 15 wt % |
| Wax | 1.0 wt % |
| Surfynol ® 104PA | 1.0 wt % |

Flexiverse® yellow base is an organic pigment dispersion available from Sun Chemical Corporation, Parsippany N.J.

The ink was printed on corona-treated polyethylene with a lab proofer. When tested for high speed printing properties it matched a solvent based ink and the pinholing on the lab prints was comparable to that of a solvent based ink.

Comparative Example A: Low Alcohol Ink Formulation

A white water-based ink with a 3 wt % alcohol content was made as follows:

TABLE 7

| Material | Wt % |
| --- | --- |
| Surfynol ® 104 PA | 0.50 |
| HydriPrint ™ 604 | 39.00 |
| Mono ethanol amine | 0.50 |
| Mix 5 minutes and add . . . | |
| Ethanol-SDA-3C (95/5 Ethanol/IPA) | 3.00 |
| Tap Water | 4.00 |
| Joncryl ® Wax 4 (40% Solids) | 1.00 |
| Mix 5 minutes and add . . . | |
| TR-52 | 20.50 |
| Mix 5 minutes and add . . . | |
| TR-52 | 20.50 |
| Ethanol-SDA-3C (95/5 Ethanol/IPA) | 3.00 |
| Tap Water | 8.00 |
| | 100.00 |

Joncryl® Wax 4 is a large particle polyethylene wax.

When tested in comparison to standard solvent based ink on a corona treated polyethylene substrate, the ink had poor lay, as determined from a pinhole assessment.

Comparative Example B: Ink Formulation Not Including Latex

Example with Solution Resin

An ink was made as follows (latex replaced with solution resin)

TABLE 8

| Material | |
| --- | --- |
| Surfynol ® 104 PA | 0.50 |
| HydriCryl ™ 345 | 39.00 |
| Mono ethanol amine | 0.50 |
| Mix 5 minutes and add . . . | |
| Ethanol-SDA-3C (95/5 Ethanol/IPA) | 8.00 |
| Tap Water | 4.00 |
| Joncryl ® Wax 4 (40% Solids) | 1.00 |
| Mix 5 minutes and add . . . | |
| TR-52(TiO2 pigment) | 20.50 |
| Mix 5 minutes and add . . . | |
| TR-52 | 20.50 |
| Ethanol-SDA-3C (95/5 Ethanol/IPA) | 3.00 |
| Tap Water | 3.00 |
| | 100.00 |

HydriCryl™ 345 is a styrene-acrylic resin solution available from Hydrite Chemical Co., Brookfield Wis.

When tested in comparison to standard solvent based ink on a corona treated polyethylene substrate, the ink had poor adhesion and water resistance (determined by placing printed articles into a water bath and observing the removal of ink).

Comparative Example C: Ink Formulation Including Non-Alcohol Tolerant Latex

An ink that includes a non-alcohol tolerant latex was made as follows:

TABLE 9

| Material | |
| --- | --- |
| Surfynol ® 104 PA | 0.50 |
| NeoCryl ® 1171 - a non-alcohol tolerant latex | 39.00 |
| Mono ethanol amine | 0.50 |
| Mix 5 minutes and add . . . | |
| Ethanol-SDA-3C (95/5 Ethanol/IPA) | 8.00 |
| Tap Water | 4.00 |
| Joncryl ® Wax 4 (40% Solids) | 1.00 |
| Mix 5 minutes and add . . . | |
| TR-52(TiO2 pigment) | 20.50 |
| Mix 5 minutes and add . . . | |
| TR-52 | 20.50 |
| Ethanol-SDA-3C (95/5 Ethanol/IPA) | 3.00 |
| Tap Water | 3.00 |
| | 100.00 |

The ink was found to have a high viscosity (500 cps). The ink was reduced by 30% with a reducing solvent (50% water, 49% ethanol, 1% mono ethanol amine) to get to a final press viscosity of 80 cps. The resulting print had low opacity (47 vs. 58 for a standard solvent based ink. The NeoCryl® 1171 latex in the above ink was found to have about a 20% particle size increase in the presence of ethanol.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A composition, comprising:
   about 10 wt % to about 30 wt % water miscible solvent having a boiling point of about 56° C. to about 98° C.;
   water; and
   5 wt % to about 50 wt % of a latex, wherein resin particles in the latex increase 0 to 15% in particle size in the presence of an alcohol;
   wherein the composition does not contain glycol ethers, and wherein the composition is a water-based flexographic printing ink or a gravure printing ink,
   wherein in combination, the water and the water-miscible solvent comprise 15 wt % to 40 wt % of the ink.

2. The composition of claim 1, wherein the water miscible solvent comprises a solvent selected from an alcohol, a ketone, an acetate, and mixtures thereof.

3. The composition of claim 1, wherein the water miscible solvent comprises an alcohol selected from ethanol, n-propanol, isopropyl alcohol, and mixtures thereof.

4. The composition of claim 1, wherein the water miscible solvent is ethanol.

5. The composition of claim 1, wherein resin particles in the latex increase 0 to 10% in particle size in the presence of alcohol.

6. The composition of claim 1, wherein the latex comprises acrylic resin particles.

7. The composition of claim 1, wherein the water-miscible solvent is present in the ink in an amount of about 10 wt % to about 20 wt %.

8. The composition of claim 1, further comprising an additional resin component.

9. The composition of claim 1, further comprising a surfactant; and/or further comprising a defoamer; and/or further comprising a dispersant.

10. The composition of claim 1, wherein the composition is a flexographic printing ink that is printable at speeds of ≥600 meters/minute.

11. The composition of claim 1, wherein the composition is a gravure printing ink that is printable at speeds of ≥200 meters/minute.

12. The composition of claim 1, wherein the dynamic surface tension is about 25 dynes/cm to about 35 dynes/cm.

13. The composition of claim 1, having a flash point that is ≥40° C.

14. The composition of claim 1, further comprising a colorant.

15. An article comprising:
    a substrate printed with the composition of claim 1.

16. A composition comprising:
    a water miscible solvent having a boiling point of about 56° C. to about 98° C. in an amount of about 10 wt % to about 30 wt %;
    water; and
    an alcohol tolerant latex in an amount of about 20 wt % to about 50 wt %,
    wherein the composition does not contain glycol ethers, and wherein the composition is a water-based high speed flexographic printing ink wherein in combination, the water and the water-miscible solvent comprise 15 wt % to about 40 wt % of the ink.

17. A composition comprising:
    a water miscible solvent having a boiling point of about 56° C. to about 98° C. in an amount of about 10 wt % to about 30 wt %,
    water; and
    an alcohol tolerant latex in an amount of about 20 wt % to about 30 wt %, wherein the composition does not contain glycol ethers,
    wherein the composition is water-based high speed flexographic printing ink wherein in combination, the water and the water-miscible solvent comprise 15 wt % to about 40 wt % of the ink.

* * * * *